Figure 1:
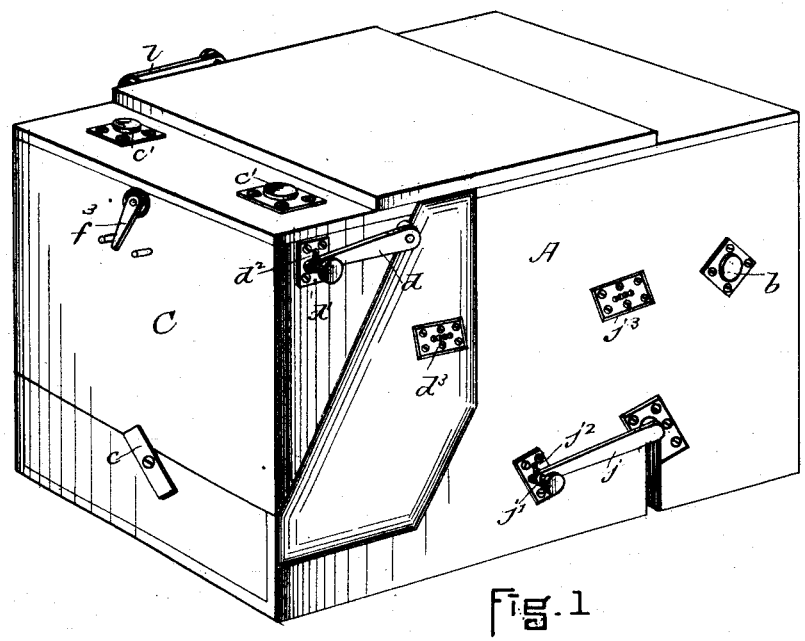

(No Model.)  2 Sheets—Sheet 1.
A. W. SIMON.
PHOTOGRAPHIC CAMERA.

No. 422,984.  Patented Mar. 11, 1890.

WITNESSES.  INVENTOR.

(No Model.) 2 Sheets—Sheet 2.

A. W. SIMON.
PHOTOGRAPHIC CAMERA.

No. 422,984. Patented Mar. 11, 1890.

WITNESSES.
Geo. O. G. Crah
Fred B. O'Neil

INVENTOR.
Alfred W. Simon

UNITED STATES PATENT OFFICE.

ALFRED W. SIMON, OF AKRON, NEW YORK, ASSIGNOR OF ONE-HALF TO DAVID M. LITTLE, OF SALEM, MASSACHUSETTS.

PHOTOGRAPHIC CAMERA.

SPECIFICATION forming part of Letters Patent No. 422,984, dated March 11, 1890.

Application filed October 8, 1886. Serial No. 215,732. (No model.)

*To all whom it may concern:*

Be it known that I, ALFRED W. SIMON, of Akron, in the county of Erie and State of New York, have invented a new and useful Improvement in Photographic Cameras, of which the following is a specification.

In the drawings is shown a camera embodying my invention in the best form known to me, the lens and tube being omitted.

Figure 2:
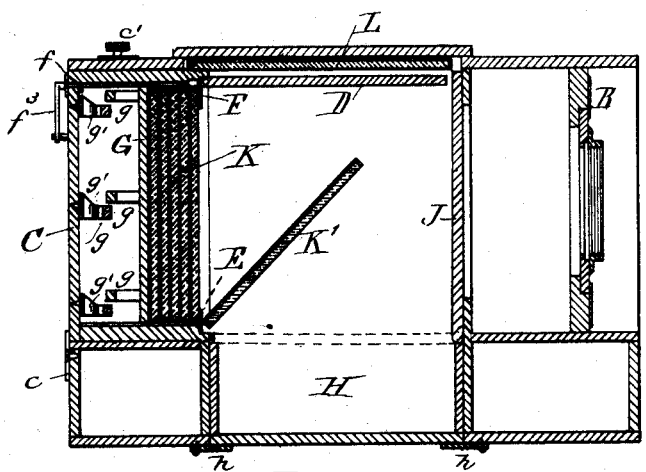
Figure 3:
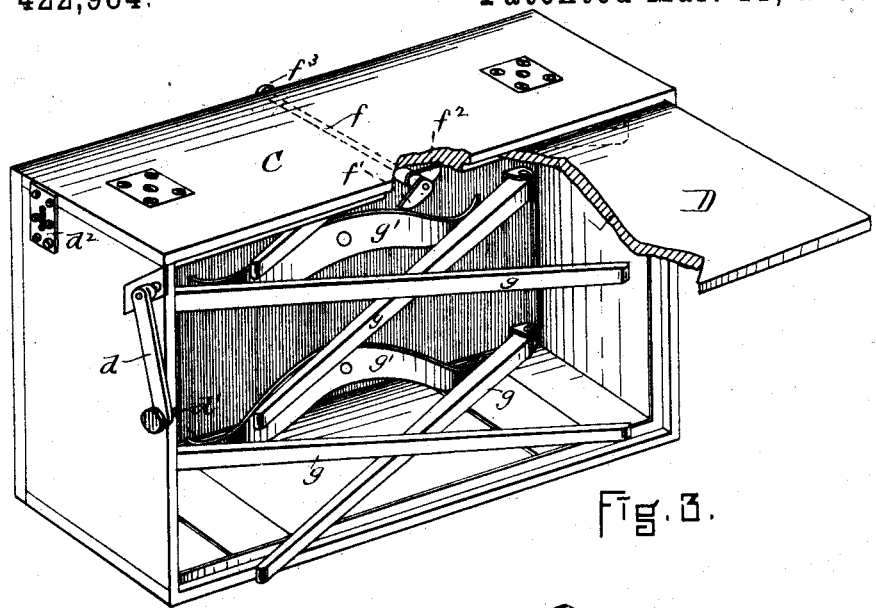
Figure 4:
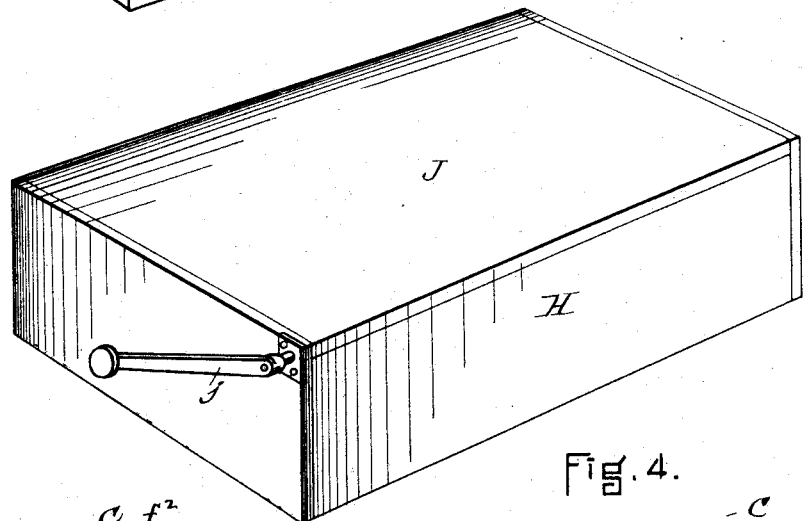

Figure 1 is a perspective view of such a camera. Fig. 2 is a vertical longitudinal section of such a camera in use, showing the plate which has been exposed in the act of falling into a receiving-box. Fig. 3 shows the plate-reservoir, and Fig. 4 shows the receiving-box. The other figures (5, 6, and 7) show details of the catch.

A is a camera-box of ordinary construction so far as the arrangements for admitting light are concerned.

B is the lens-flange fitted to the movable end of the camera, $b$ being a set-screw to hold the lens-supporting piece in place when the camera is focused.

C is the reservoir or plate-holder. This reservoir is a box capable of containing a number of sensitive plates and protecting them completely against exposure to light, except at the proper time.

D is a cover upon the side of the box which is to be nearest the lens when the camera is in use. This cover or shutter is suitably hinged at the top, and is opened or shut by means of a crank-arm $d$, which is provided with a suitable lock to lock the cover D open or shut, as desired. The arm $d$, as shown, is a thin piece of spring metal and has at its free end a pin $d'$, which catches on a rack indented in the plates $d^2$ $d^3$, which are conveniently located on the camera or box. This form of lock is very simple and answers every purpose if the arm $d$ be stiff enough to keep the pin in the rack under all ordinary conditions of use. The reservoir C is intended to set into the back of the camera much as the ordinary plate-holder does, and is held in place in some convenient way—for example, a button $c$ and thumb-screws $c'$.

The plate which is to be exposed is held in place in the reservoir C by a rim E at the front lower edge of the reservoir and a catch F at the front upper edge, the catch being so constructed that it will release only one plate at a time, and when it is returned to its normal position the next plate in order will rest against its holding-finger $f'$ and the rim E, which together keep the plates from falling out, being so placed that the face of the plate resting against them will be exactly in focus.

Figure 6:
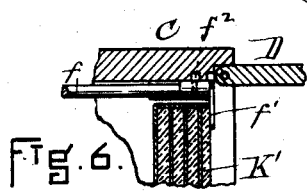
Figure 7:
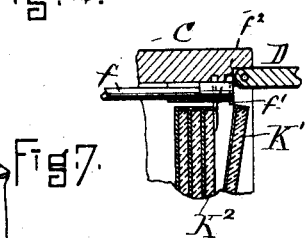

The plates are kept in the front of the reservoir by a suitable spring. It consists of a bed-plate G, of substantially the size of the interior of the box, resting against a series of levers $g$, each hinged to the back of the box, as shown, under each lever, being flat spring $g'$. These springs force the free ends of the levers forward, and they bear on the back of the plate to force it and the sensitive plates in front of it forward, so that the front plate will bear against the rim E and catch F, and consequently be the required distance from the lens when the catch is properly adjusted. This arrangement of levers, springs, and bed-plate is advantageous, as it serves to distribute the spring-power and equalize the pressure against the catch and rim, whether the reservoir be full of plates or nearly empty. The catch F is mounted upon a shaft $f$, upon which are two fingers $f'$ $f^2$, the front one $f'$ serving with the rim E to hold the plate in place when ready for exposure. The other finger $f^2$ is set at an angle to the finger $f'$ and a little behind it, as shown, so that as the finger $f'$ is raised to release the upper edge of the front plate the finger $f^2$ will be depressed between that plate and the one behind it, and will hold the second plate until the finger $f'$ has been returned to its first position after releasing the plate just exposed, (see Figs. 6 and 7,) when the springs $g'$ will act to force this second plate into focus against the finger $f'$. These fingers are moved by a handle $f^3$ at the back of the reservoir.

The receiving-box H is set just in front of the reservoir C, so that the plate as it is expelled from the reservoir will fall face down into this receiver. This box is provided with a cover or shutter J, having operating mechanism $j, j', j^2$, and $j^3$, like that of the shutter D of the reservoir C. This receiver, as shown, is detachable and is held in place by buttons $h$. It may, however, be made part of the camera, in which case the plates are removed from it in the dark-room through the end of the camera, which ordinarily contains the reservoir C. When empty, its shutter may be used as an exposing-shutter. Such an exposing-shutter—viz., one hinged in the camera behind the lens—is often very convenient.

The cover J of the receiver H must be opened to allow the exposed plate to fall in the box and be closed again before the lens can be used.

Figure 5:
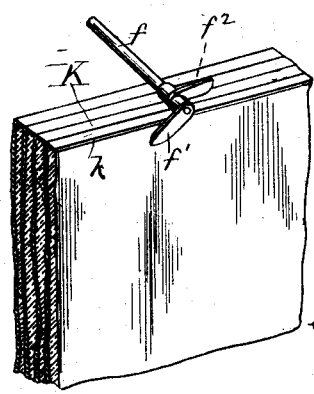

When a large number of plates are placed together, as described, each must be so backed that no light will pass through it during its exposure to affect the plate behind it. This backing may be in the form of a piece of cardboard, in which case it should be clamped in place by a suitable clamp at the top; or it may be a sheet of metal, in which case the metal should be wide enough to be bent round the plate at the top and bottom, (see $k$, Fig. 5.) If sensitive paper or film is to be used, it should be backed in some way, so as to be stiff enough to stand in the reservoir, as well as thick enough to prevent the passage of light to affect the plates behind it.

L is a focusing-screen hinged to the top of the camera and operated by a crank-handle $l$ in the same way that the shutters D and J are operated. When the reservoir C is removed, this screen can be let down into the place in the camera which will be occupied by the front sensitive plate in the reservoir, and the set-screw $b$ being loosened the lens-conveying frame will be moved until the camera is properly focused, when the set-screw $b$ is again tightened and the screen raised.

The operation of this camera is as follows: The reservoir is first charged with sensitive plates K, which have been properly backed, as described. The plates are put into the box by being first placed with one edge within the rim E, and then pressed down until the opposite edge is within the finger $f'$. Then they are released with the hand, and the springs under the bed-plate G will force the plates forward until the plate to be first exposed will rest against the rim E and the finger $f'$ of the catch F. The camera is first focused, as above described. The screen L is then turned up out of the way, and the reservoir C is secured in position in the camera with its shutter toward the lens. To expose the plate, the shutter D must be raised, and also the lens-shutter. As soon as the lens is covered after the exposure, the shutter J to the receiver is opened, and the catch F being operated by turning its handle $f^3$ the top of the plate K' is released, and the springs $g'$, acting through the levers $g$ and bed-plate G, cause the top of the plate, with its backing, to fall forward, (see Fig. 2,) its bottom tripping over the rim E, so that the plate will fall face down into the receiver H, the top of the plate striking first. This box H is just large enough to receive the falling plate, so that an air-cushion is formed which will prevent the plate from breaking. The cover to the receiver is then closed, and the catch F being operated so as to allow the plate $K^2$ to fall against the finger $f'$ the camera is in condition to take a second picture. If it is desired to postpone the taking of the second picture for a time, the shutter D may be dropped. When all the plates have been used up, the reservoir is removed to the dark-room to be recharged and the receiver is removed to the dark-room to be emptied.

Other forms of springs, either with or without a bed-plate, may be used to keep the plates in the front of the reservoir, and other well-known forms of catch capable of separating the front one of a series of moving objects from those behind it and releasing it, while allowing the next in the series to take its place, may be substituted for that shown. My catch, however, is very simple, and is the best known to me for the purpose. It takes up but little room, and hence affects to a very slight degree the available area of the finished negative, the plate in my reservoir being held in place merely by the rim E and the catch. For this reason a plate-holder adapted to hold a single plate may well be made with a spring for the purpose described and such a catch and rim. When it is desired to expose a single plate, the shutter D will be found very useful as an exposing-shutter, and its usefulness for this purpose is of course not confined to a plate-holder capable of holding a large number of plates.

It is desirable in such a camera as is above described that the covers D and J shall shut into their boxes, to prevent such an entrance of light as will spoil the plates contained therein, and it is also desirable that a suitable strip be laid in the camera to stop the entrance of light between the bottom of the reservoir C and the floor of the camera. In the camera shown in the drawings (see Fig. 2) this function is performed by the receiver H, which is made sufficiently high to set into the camera so as to cover this joint.

What I claim as my invention is—

1. The plate-reservoir, in combination with the springs $g'$, the levers $g$ and the bed-plate G, rim E, and latch F, as described.

2. In a plate-reservoir, the latch above described, consisting of the shaft $f$ and fingers $f'$ $f^2$, and suitable handle, whereby the shaft may be operated, substantially as described.

In testimony whereof I have hereunto subscribed my name this 6th day of October, A. D. 1886.

ALFRED W. SIMON.

Witnesses:
GEORGE O. G. COALE,
FRED B. O'NEIL.